US012409472B2

(12) United States Patent
Chaney

(10) Patent No.: US 12,409,472 B2
(45) Date of Patent: Sep. 9, 2025

(54) PAINT ROLLER ASSEMBLY

(71) Applicant: David Michael Chaney, Lafayette, LA (US)

(72) Inventor: David Michael Chaney, Lafayette, LA (US)

( * ) Notice: Subject to any disclaimer, the term of this patent is extended or adjusted under 35 U.S.C. 154(b) by 429 days.

(21) Appl. No.: 18/008,467

(22) PCT Filed: Jul. 29, 2021

(86) PCT No.: PCT/US2021/043589
§ 371 (c)(1),
(2) Date: Dec. 6, 2022

(87) PCT Pub. No.: WO2022/031499
PCT Pub. Date: Feb. 10, 2022

(65) Prior Publication Data
US 2023/0201867 A1 Jun. 29, 2023

Related U.S. Application Data

(60) Provisional application No. 63/060,749, filed on Aug. 4, 2020.

(51) Int. Cl.
*B05C 17/02* (2006.01)

(52) U.S. Cl.
CPC ................................ *B05C 17/0205* (2013.01)

(58) Field of Classification Search
CPC . B05C 17/0205; B05C 17/0217; B05C 17/02; B05C 17/0245; B25G 3/36; B25G 3/38; B25G 3/16; B25G 3/14; B25G 3/18; B44D 3/12; B44D 3/123; A46B 2200/202; A46B 2200/20
USPC ........ 15/145, 230.11, 256.52, 176.6, 257.06, 15/103.5; 401/220; 118/258
See application file for complete search history.

(56) References Cited

U.S. PATENT DOCUMENTS 2,540,008 A 1/1951 Pasotti et al.
5,509,165 A 4/1996 Zigelbolm et al.
5,921,905 A 7/1999 Newman, Jr. et al.
6,925,686 B2 * 8/2005 Heathcock ............... B25G 1/04 16/427

(Continued)

FOREIGN PATENT DOCUMENTS

CA 2472171 C * 8/2012 ............... B25G 3/36

OTHER PUBLICATIONS

Search Report and Written Opinion dated Dec. 30, 2021.
Supplemental European Search Report dated May 9, 2024.

*Primary Examiner* — Robert F Neibaur
(74) *Attorney, Agent, or Firm* — Peter J. Rashid

(57) ABSTRACT

A paint roller assembly for allowing a sufficient amount of pressure to be applied for distributing paint evenly is disclosed. The paint roller assembly includes a pair of frame members. One frame member includes a handle. A cylindrical-shaped core is attached to another end of each of the frame members. In one aspect, the pair of frame members are coupled to each other at a first end by a variety of different coupling mechanisms. When assembled, a central, longitudinal axis of the handle is substantially parallel to a central, longitudinal axis of the cylindrical-shaped core, thereby allowing the user to apply sufficient pressure to more evenly distribute paint during use.

15 Claims, 9 Drawing Sheets

(56) References Cited

U.S. PATENT DOCUMENTS

| | | | | |
|---|---|---|---|---|
| 7,162,768 | B1 * | 1/2007 | Gartner | B05C 17/0217 492/19 |
| 7,404,228 | B2 | 7/2008 | Hodges | |
| 8,671,501 | B2 * | 3/2014 | Buckel, Jr. | B05C 17/022 15/230.11 |
| 9,649,656 | B2 | 5/2017 | Brooks | |
| 10,279,370 | B2 * | 5/2019 | Arvinte | B05C 17/0217 |
| 2002/0187888 | A1 | 12/2002 | Newman et al. | |
| 2004/0168276 | A1 | 9/2004 | Lye | |
| 2005/0091777 | A1 | 5/2005 | Lu | |
| 2006/0123578 | A1 | 6/2006 | Rickstrew | |
| 2007/0017050 | A1 | 1/2007 | Lye | |
| 2009/0064434 | A1 * | 3/2009 | Mallaridas | B05C 17/0217 15/210.1 |
| 2009/0064436 | A1 | 3/2009 | Scott, Sr. | |
| 2015/0038308 | A1 | 2/2015 | Buckel, Jr. et al. | |
| 2018/0304300 | A1 | 10/2018 | Arvinte et al. | |

* cited by examiner

PAINT ROLLER ASSEMBLY

FIELD OF THE DISCLOSURE

The invention pertains to the field of paint rollers. More particularly, the invention pertains to a paint roller assembly with a handle that is substantially parallel to the roller or paint applicator.

BACKGROUND OF THE DISCLOSURE

A traditional roller brush consists of a wire frame and a handle pointing straight at the roller. With a traditional roller brush, your hand is usually flexed forward, which puts stress on your wrist and forearm. In addition, due to the flimsy construction of the wire frame, you also find yourself working harder to apply paint in a consistent manner. Normally, you have to push harder on the end of the roller that doesn't have the frame connected. This often leaves a line of paint on the other side of the roller.

In view of the foregoing, it would be desirable to provide a paint roller assembly that overcomes the above-mentioned shortcomings of a conventional roller brush.

SUMMARY OF THE DISCLOSURE

While painting my back deck, I came up with an idea for a new frame that would help eliminate the fatigue associated with painting for extended periods of time. With my paint roller assembly, the handle runs parallel to the roller cover or paint applicator, which allows you to hold the assembly with a natural, comfortable hand position. By doing so, the invention helps to eliminate the wrist and forearm fatigue associated with using conventional paint roller assemblies for extended periods of time. Because the support members or frame members support the roller cover from both sides of the roller cover, the paint roller assembly of the invention also provides a more consistent finished product. The solid construction and design of the handle allow you to apply force to the paint roller assembly, and in particular, to the roller cover or paint applicator, with your entire arm and in many cases, your whole body.

In one aspect of the invention, a paint roller assembly comprises a pair of frame members. A handle is attached to a first end of each of the frame members. A cylindrical-shaped core is attached to a second end of each of the frame members. The cylindrical-shaped core is configured to rotate about a central, longitudinal axis, wherein the central, longitudinal axis of the handle is substantially parallel to a central, longitudinal axis of the cylindrical-shaped core when the paint roller assembly is assembled. The parallel arrangement between the handle and the cylindrical-shaped core enables sufficient pressure to be applied to more evenly distribute paint during use of the paint roller assembly.

In another aspect of the invention, a paint roller assembly comprises a first part and a second part coupled to each other at a first end by a coupling mechanism. The second part includes a handle (having a central, longitudinal axis. A cylindrical-shaped core is attached to a second end of each of the first part and the second part. The cylindrical core is configured to rotate about a central, longitudinal axis. The central, longitudinal axis of the handle is substantially parallel to a central, longitudinal axis of the cylindrical-shaped core when the paint roller assembly is assembled. Similar to the earlier aspect of the invention, the parallel arrangement between the handle and the cylindrical-shaped core enables sufficient pressure to be applied to more evenly distribute paint during use of the paint roller assembly.

BRIEF DESCRIPTION OF THE DRAWINGS

While various embodiments of the invention are illustrated, the particular embodiments shown should not be construed to limit the claims. It is anticipated that various changes and modifications may be made without departing from the scope of this invention.

DETAILED DESCRIPTION

Figure 1A:
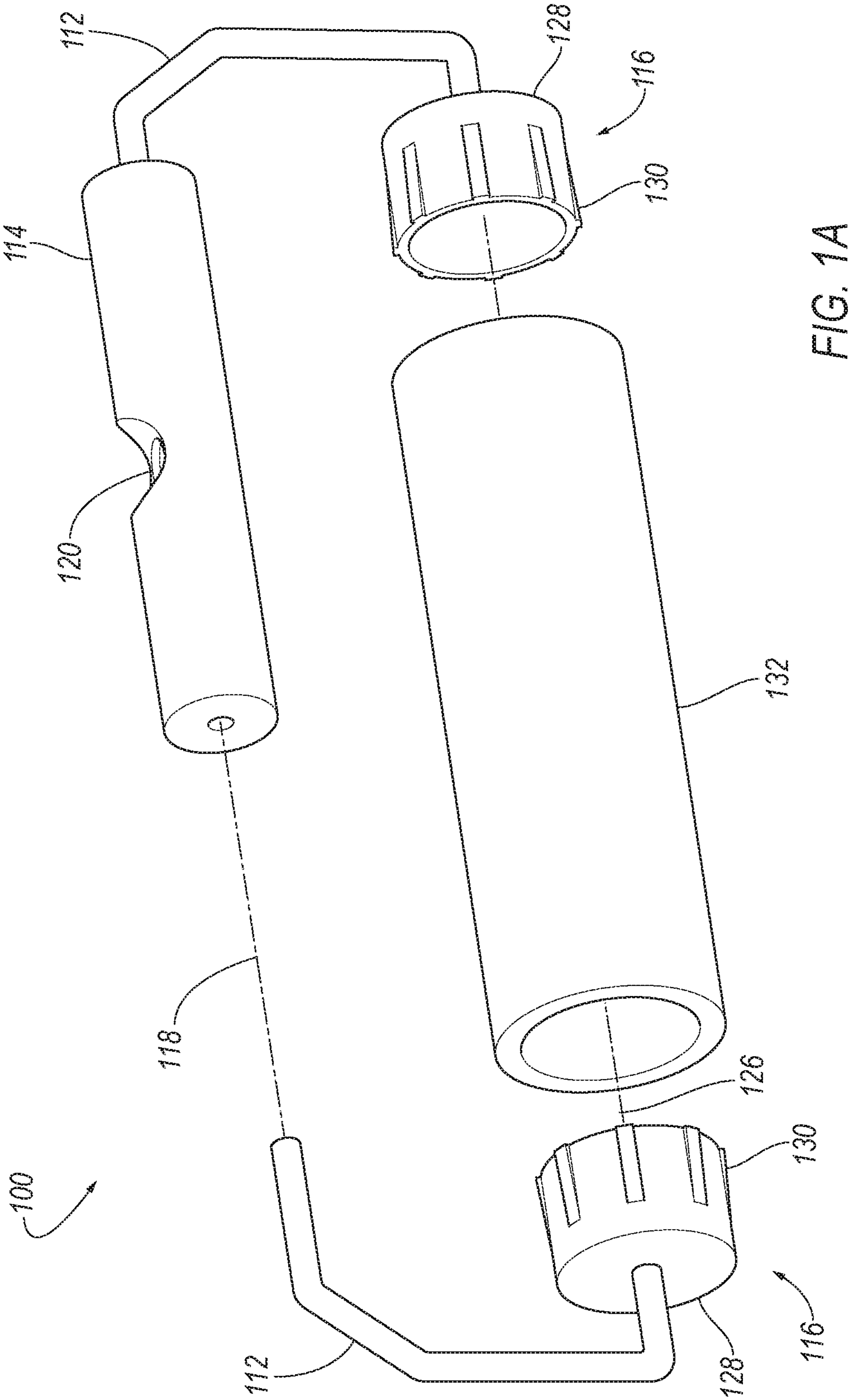
FIG. 1A is a front perspective view of a paint roller assembly when assembled according to an aspect of the invention.

Directional phrases used herein, such as, for example, left, right, front, back, top, bottom and derivatives thereof, relate to the orientation of the elements shown in the drawings and are not limiting upon the claims unless expressly recited therein. Identical parts are provided with the same reference number in all drawings.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

Throughout the text and the claims, use of the word "about" in relation to a range of values (e.g., "about 22 to 35 wt %") is intended to modify both the high and low values recited, and reflects the penumbra of variation associated with measurement, significant figures, and interchangeability, all as understood by a person having ordinary skill in the art to which this disclosure pertains.

For purposes of this specification (other than in the operating examples), unless otherwise indicated, all numbers expressing quantities and ranges of ingredients, process conditions, etc., are to be understood as modified in all instances by the term "about". Accordingly, unless indicated to the contrary, the numerical parameters set forth in this specification and attached claims are approximations that can vary depending upon the desired results sought to be obtained by embodiments. At the very least, and not as an attempt to limit the application of the doctrine of equivalents to the scope of the claims, each numerical parameter should at least be construed in light of the number of reported significant digits and by applying ordinary rounding techniques. Further, as used in this specification and the appended claims, the singular forms "a", "an" and "the" are intended to include plural referents, unless expressly and unequivocally limited to one referent.

Notwithstanding that the numerical ranges and parameters setting forth the broad scope are approximations, the numerical values set forth in the specific examples are reported as precisely as possible. Any numerical value, however, inherently contains certain errors necessarily resulting from the standard deviation found in their respective testing measurements including that found in the measuring instrument. Also, it should be understood that any numerical range recited herein is intended to include all sub-ranges subsumed therein. For example, a range of "1 to 10" is intended to include all sub-ranges between and including the recited minimum value of 1 and the recited maximum value of 10, i.e., a range having a minimum value equal to or greater than 1 and a maximum value of equal to or less than 10. Because the disclosed numerical ranges are continuous, they include every value between the minimum and maximum values. Unless expressly indicated otherwise, the various numerical ranges specified in this application are approximations.

The singular forms "a", "an", and "the" include plural references unless the context clearly dictates otherwise.

Figure 1B:
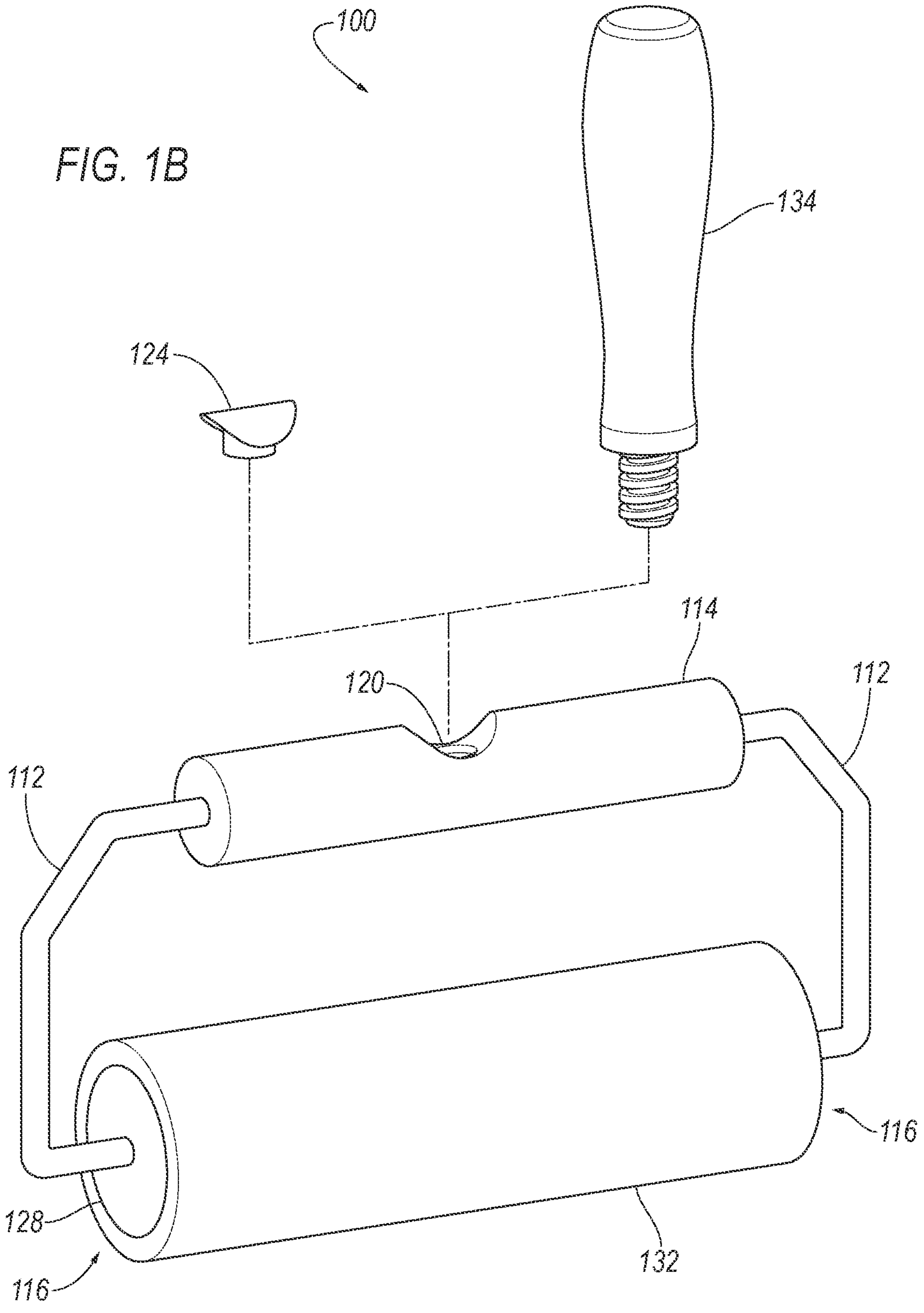
FIG. 1B is an exploded view of the paint roller assembly of FIG. 1A when assembled.

As shown in FIGS. 1A and 1B, a paint roller assembly 100 is shown according to one aspect of the invention. The paint roller assembly 100 has a cylindrical-shaped handle 114 and a pair of opposing frame members or support arms 112. The frame members 112 are preferably made of suitable material, such as metal, and the like. A cylindrical-shaped core 116 comprising a spring cage 130 and an end cap 128 is mounted or attached to one end of each frame member or support arm 112, which is inserted into a roller cover or paint applicator 132. The spring cage 130 and the end cap 128 are made of a suitable material, such as plastic, and the like. The opposite end of each frame member or support arm 112 is inserted into each side of the handle 114 and into the end caps 128, respectively. Once the paint roller assembly 100 is assembled, a central, longitudinal axis 118 of the handle 114 is substantially parallel to a central, longitudinal axis 126 of the cylindrical-shaped core 116. This parallel configuration allows the user to apply sufficient pressure to the paint roller assembly 100 to more evenly distribute paint during use as compared to conventional paint roller assemblies.

Located in the middle of the handle 114, on the top, is a threaded hole 120. This threaded hole 120 is used to support a conventional handle 134 or an extension pole that can be threaded into the hole 120. When not in use, a plug 124 can be used to seal the threaded hole 120 and prevent dirt, paint, etc. from entering the threaded hole 120. Unfortunately, this embodiment of the invention is a fixed design, which doesn't allow the consumer to change out the roller cover 132. The materials used to construct the paint roller assembly 100 can include, but are not limited to, plastic, wood, metal, etc. In addition, the size of all parts, including the main frame, handle, cylindrical core, etc. include, but are not limited to, the proportions shown in the illustrations.

Figure 2:
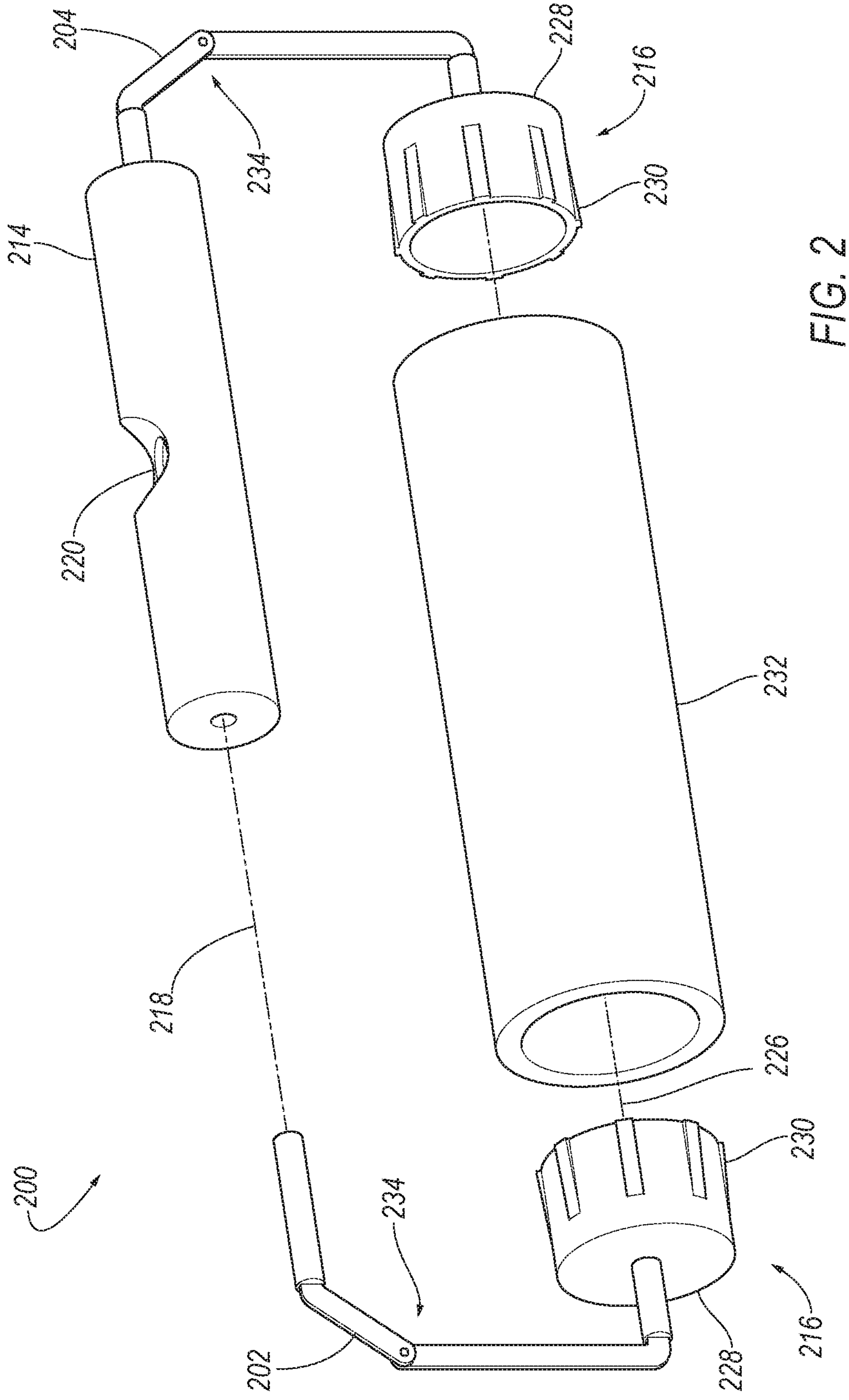
FIG. 2 is a front view of a paint roller assembly of FIG. 1A including a frame member with a hinge according to an aspect of the invention.

Referring now to FIG. 2, a paint roller assembly 200 is shown according to another aspect of the invention. Similar to the paint roller assembly 100, the paint roller assembly 200 includes a handle 214 made of suitable material, such as wood, and the like, and two frame members or support arms 202, 204 made out of suitable material, such as metal, and the like. At the end of each support arm 202, 204 is a cylindrical core 216, which is inserted into the roller cover 232. The cylindrical core 216 comprises a spring cage 230 and two end caps 228 made of suitable material, such as plastic, and the like. The opposite end of each support arm 202, 204 is permanently attached to each side of the handle 214. Unlike the paint roller assembly 100, the paint roller assembly 200 has hinges 234 on each support arm 202, 204, which allow the arms 202, 204 to open to remove or replace the roller cover 232. Once the paint roller assembly 200 is assembled, a central, longitudinal axis 218 of the handle 214 is substantially parallel to a central, longitudinal axis 226 of the cylindrical-shaped core 216. This parallel configuration allows the user to apply sufficient pressure to the paint roller assembly 200 to more evenly distribute paint during use as compared to conventional paint roller assemblies.

Similar to the embodiment of FIG. 1A, a threaded hole 220 is located on the top and in the middle of the handle 214. This hole 220 is used to support a conventional handle, for example, the conventional handle 134, or an extension pole (not shown). When not in use, a plug 228 is used to seal the hole 220 and prevent dirt, paint, etc. from entering the opening 220. The materials used to construct this paint roller assembly 200 can include, but are not limited to, plastic, wood, metal, etc. In addition, the size of all parts, including the main frame, handle, cylindrical core, etc. include, but are not limited to, the proportions shown in the illustrations.

Figure 3A:
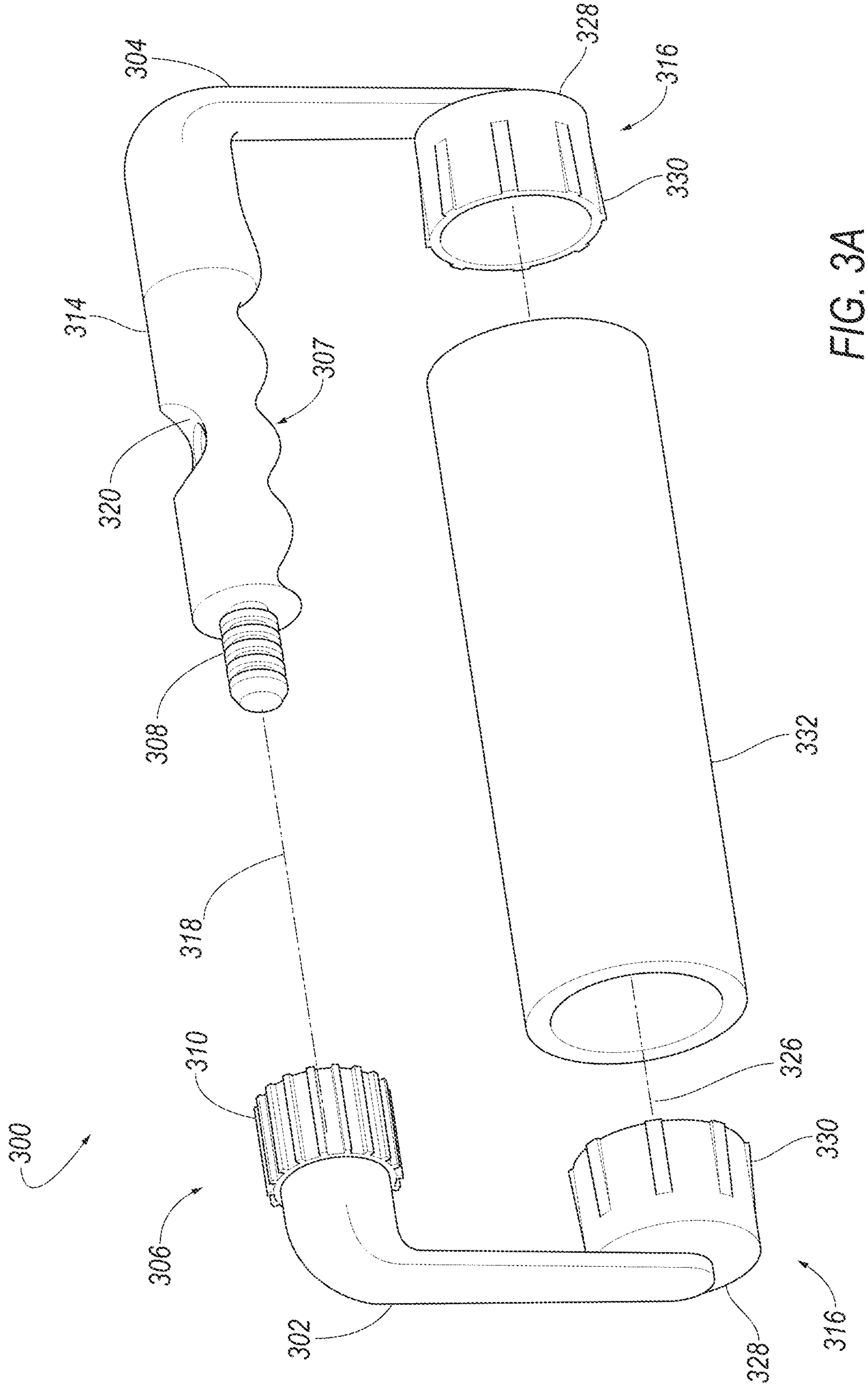
FIG. 3A is an exploded perspective view of a paint roller assembly with an ergonomic handle and two parts that are coupled together using a screw-on coupling mechanism according to another aspect of the invention.
Figure 3B:
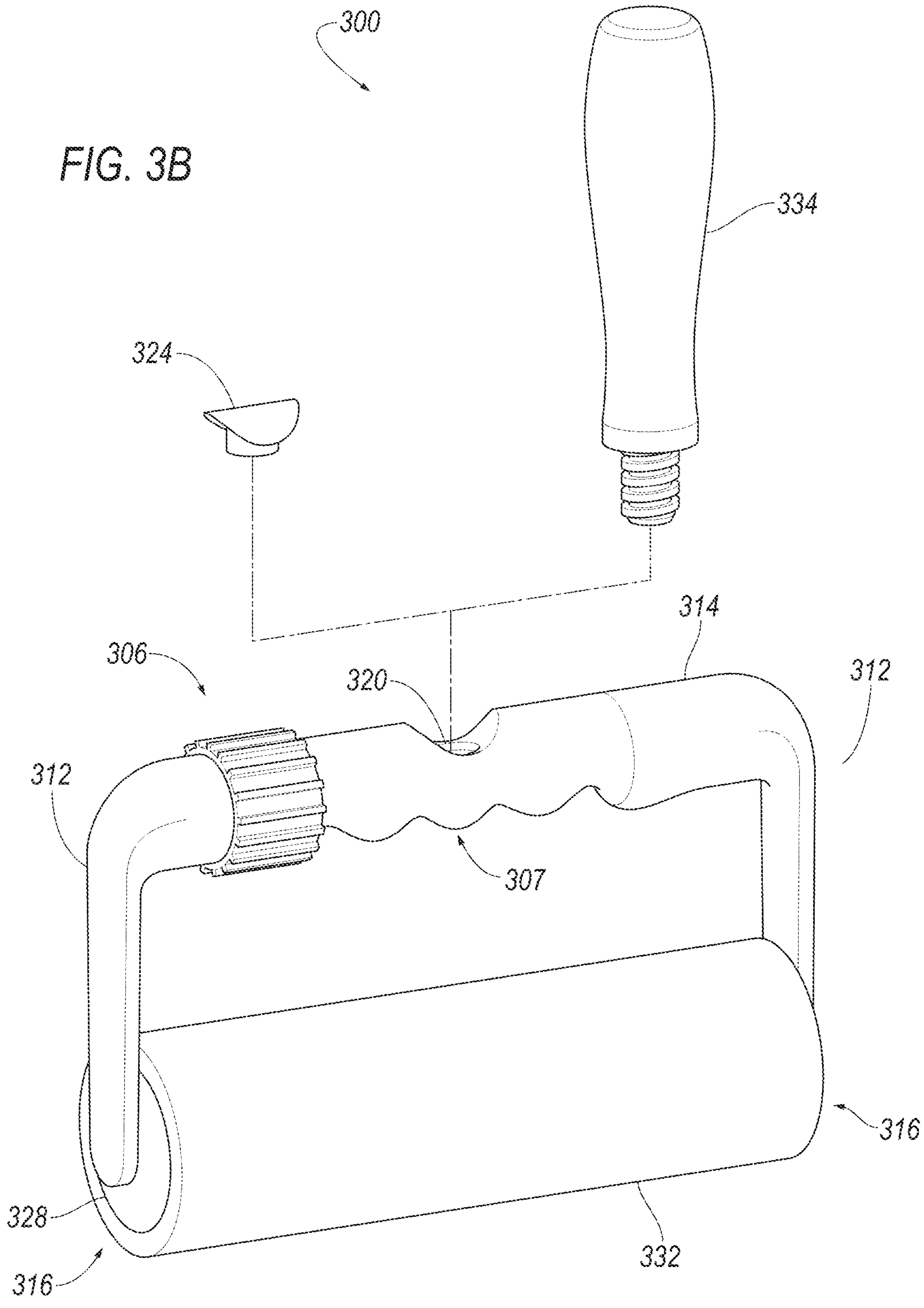
FIG. 3B is a perspective view of a paint roller assembly of FIG. 3A when assembled.

Referring now to FIGS. 3A ad 3B, a paint roller assembly 300 is shown according to another aspect of the invention. In this aspect, the paint roller assembly 300 includes two frame members or support arms 302, 304 that are coupled together using a screw-on coupling mechanism 306. One frame member 304 has an ergonomic handle 314 that includes a fingerhold 309 and a male threaded end cap 308. In the illustrated embodiment, the fingerhold 307 supports the fingers of the user and provides a more comfortable or more secure hold on the ergonomic handle 314. On the opposite end is a cylindrical core 316 that is inserted into a roller cover 332. The cylindrical core 316 comprises a spring cage 330 and a plastic end cap 328. The spring cage 330 and the end cap 328 are made of a suitable material, such as plastic, and the like. The other frame member 302 includes a female threaded coupler 310. On the opposite end of the frame member 302 is another cylindrical core 316 that is inserted into the roller cover or paint applicator 332. Once both end caps 328 have been inserted in the roller cover 332, the two frame members 302, 304 of the paint roller assembly 300 will be connected using the screw-on coupling mechanism 306. To couple the two frame members 302, 304 together, the user inserts the male end cap 308 into the female coupler 310 and turn or rotate the male end cap 308 until tightly coupled to the female coupler 310. Once the paint roller assembly 300 is assembled in this manner, a central, longitudinal axis 312 of the handle 314 is substantially parallel to a central, longitudinal axis 326 of the cylindrical-shaped core 316. This parallel configuration allows the user to apply sufficient pressure to the paint roller assembly 300 to more evenly distribute paint during use as compared to conventional paint roller assemblies.

Located in the middle of the handle 314, on the top, is a threaded hole 320. This hole 320 is used to support a conventional handle 334 or extension pole (not shown). When not in use, a plug 324 is used to seal the hole 320 and prevent dirt, paint, and the like, from entering the opening. Because the paint roller assembly 300 is constructed of two parts that separate, the roller cover 332 can be removed or replaced at any time. The materials used to construct this paint roller assembly 300 can include, but are not limited to, plastic, wood, metal, etc. In addition, the size of all parts, including the main frame, handle, cylindrical core, etc. include, but are not limited to, the proportion shown in the illustrations.

Figure 4:
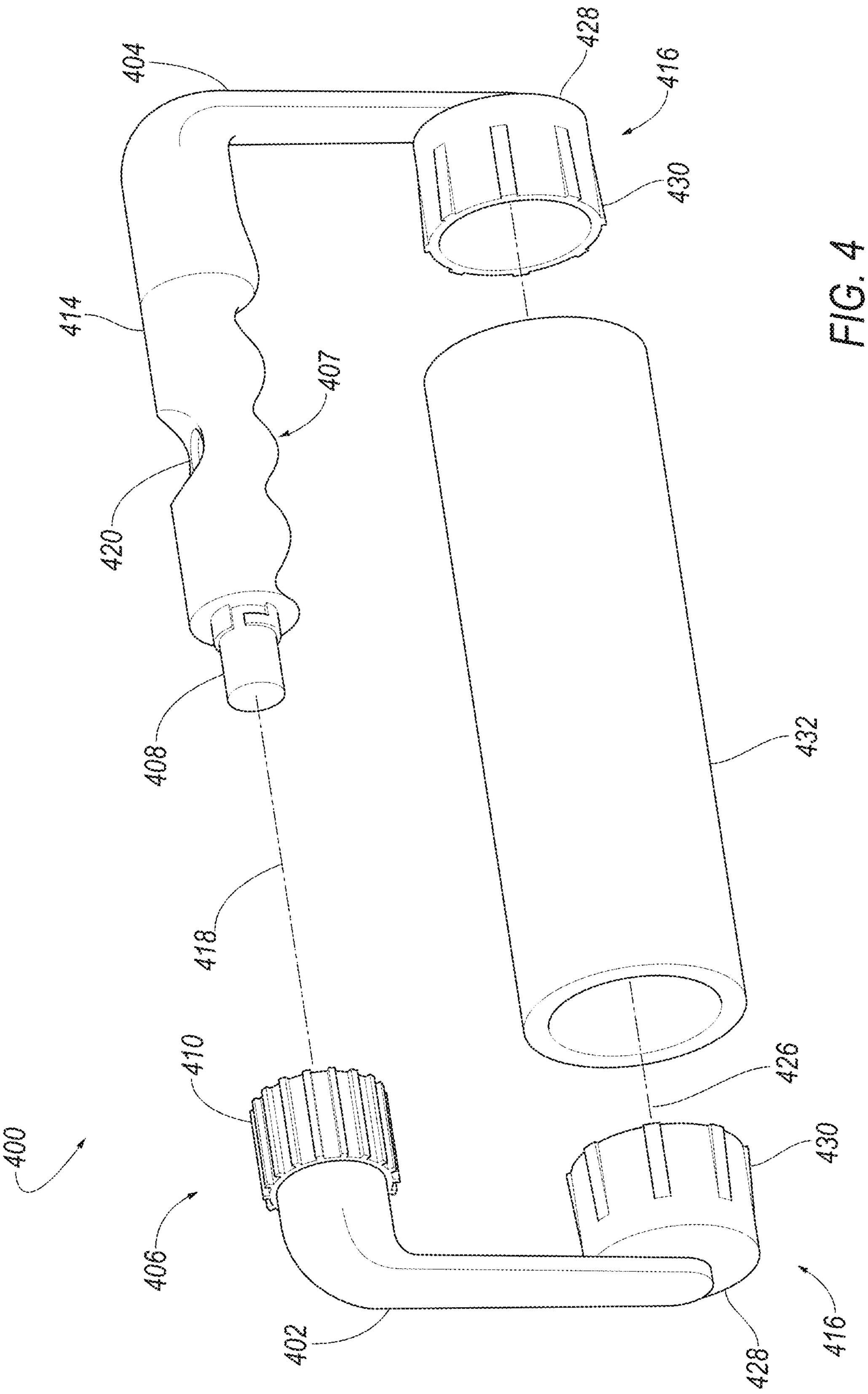
FIG. 4 is an exploded perspective view of a paint roller assembly with two parts that are coupled together using a twist-n-lock coupling mechanism according to another aspect of the invention.

Referring now to FIG. 4, a paint roller assembly 400 is shown according to another aspect of the invention. In this aspect, the paint roller assembly 400 includes two frame members or support arms 402, 404 that are coupled together by a twist-n-lock coupling mechanism 406. One frame member 404 has an ergonomic handle 414 that includes a fingerhold 407 and a male end cap 408 with one thread. Similar to the fingerhold 307, the fingerhold 407 is designed to allow the user a more comfortable or more secure hold on the ergonomic handle 414. On the opposite end is a cylindrical core 416 that is inserted into a roller cover or paint applicator 432. The cylindrical core 416 comprises a spring cage 430 and an end cap 428, preferably made of a suitable material, such as plastic, and the like. The other frame member 402 includes a female coupler 410. On the opposite end of the other frame member 402 is another cylindrical core 416 that is inserted into the roller cover 432. Once both ends have been inserted in the roller cover 432, the two frame members 402, 404 of the paint roller assembly 400 can be coupled together using the twist-n-lock coupling mechanism 406. To couple the two frame members 402, 404 of the paint roller assembly 400 together, the male end cap 408 is inserted into the female coupler 410. Pressure is applied to both frame members 402, 404, causing both ends to squeeze together. The female coupler 410 is then rotate a half turn, at which point, the two ends 402, 404 are locked. Once the paint roller assembly 400 is assembled, a central, longitudinal axis 418 of the handle 414 is substantially parallel to a central, longitudinal axis 426 of the cylindrical-shaped core 416. This parallel configuration allows the user to apply sufficient pressure to the paint roller assembly 400 to more evenly distribute paint during use as compared to conventional paint roller assemblies.

Located in the middle of the handle 414, on the top, is a threaded hole 420. This hole 420 is used to receive a conventional handle 434 or extension pole. When not in use, a plug 424 is used to seal the hole 420 and prevent dirt, paint, etc. from entering the opening. Because this paint roller assembly 400 is constructed of two frame members 402, 404 that separate, the roller cover 432 can be removed or replaced at any time. The materials used to construct this paint roller assembly can include, but are not limited to, plastic, wood, metal, etc. In addition, the size of all parts, including the main frame, handle, cylindrical core, etc. include, but are not limited to, the proportions shown in the illustrations.

Figure 5:
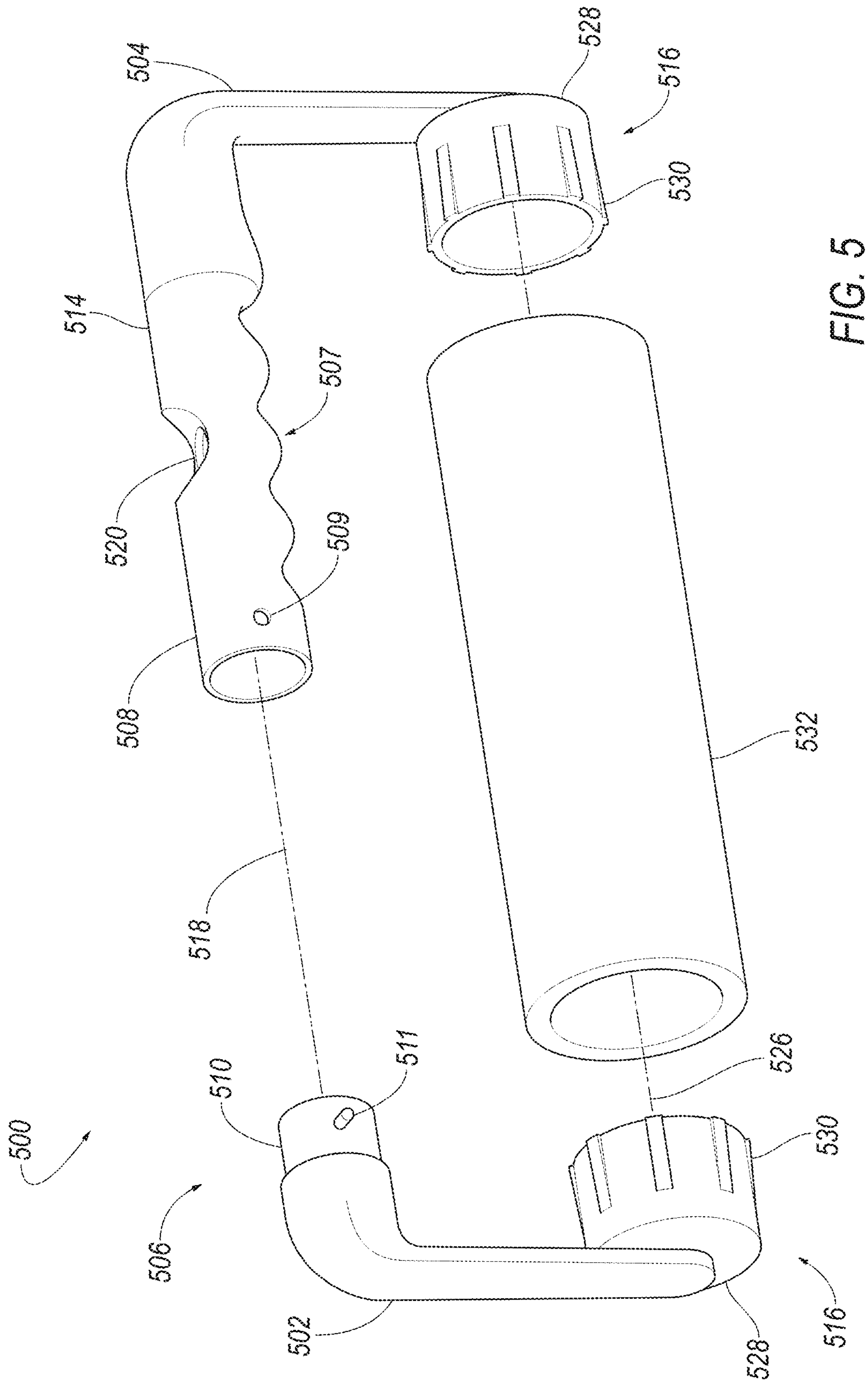
FIG. 5 is an exploded perspective view of a paint roller assembly with two parts that are coupled together using a pinch-n-release coupling mechanism according to another aspect of the invention.

Referring now to FIG. 5, a paint roller assembly 500 is shown according to another aspect of the invention. In this aspect, the paint roller assembly 500 includes two frame members or support arms 502, 504 that are coupled together by a pinch-n-release coupling mechanism 506. One frame member 504 has an ergonomic handle 514 that includes a fingerhold 507 and a female end cap 508. Similar to the fingerholds 307, 407, the fingerhold 507 is designed to allow the user a more comfortable or more secure hold on the handle 514. The female end cap 508 has two small, square shaped openings 509 on both sides of the handle 514. On the opposite end of the frame member 504 is a cylindrical core 516 that is inserted into the roller cover 532. The cylindrical core 516 comprises a spring cage 530 and an end cap 528, preferably made of a suitable material, such as plastic, and the like. The other frame member 502 includes a male end cap 510 that has two protruding square tabs 511 on each side. On the opposite end of the other frame member 502 is another cylindrical core 516 that is inserted into the roller cover 534. Once both ends of the frame members 502, 504 have been inserted in the roller cover 532, the two frame members 502, 504 of the paint roller assembly 500 will be connected using the pinch-n-release coupling 506. To attach the two frame members 502, 504 of the paint roller assembly 500, the male end cap 510 is inserted into the female end cap 508. Pressure is applied to both frame members 502, 504 until the two tabs 511 on the male end cap 510 are aligned with the openings 509 on the female end cap 508. At this point, the two tabs 511 can be released and are received within the openings 509 to firmly lock frame members 502, 504 in place. Once the paint roller assembly 500 is assembled, a central, longitudinal axis 518 of the handle 514 is substantially parallel to a central, longitudinal axis 526 of the cylindrical-shaped core 516. This parallel configuration allows the user to apply sufficient pressure to the paint roller assembly 500 to more evenly distribute paint during use as compared to conventional paint roller assemblies.

Located in the middle of the handle 514, on the top, is a threaded hole 520. The threaded hole 520 is used to support a conventional handle 534 or extension pole. When not in use, a plug 528 is used to seal the hole 520 and prevent dirt, paint, etc. from entering the opening. Because this paint roller assembly 400 is constructed of two frame members 502, 504 that separate, the roller cover 532 can be removed or replaced at any time. The materials used to construct this paint roller assembly can include, but are not limited to, plastic, wood, metal, etc. In addition, the size of all parts, including the main frame, handle, cylindrical core, etc. include, but are not limited to, the proportions shown in the illustrations.

Figure 6:
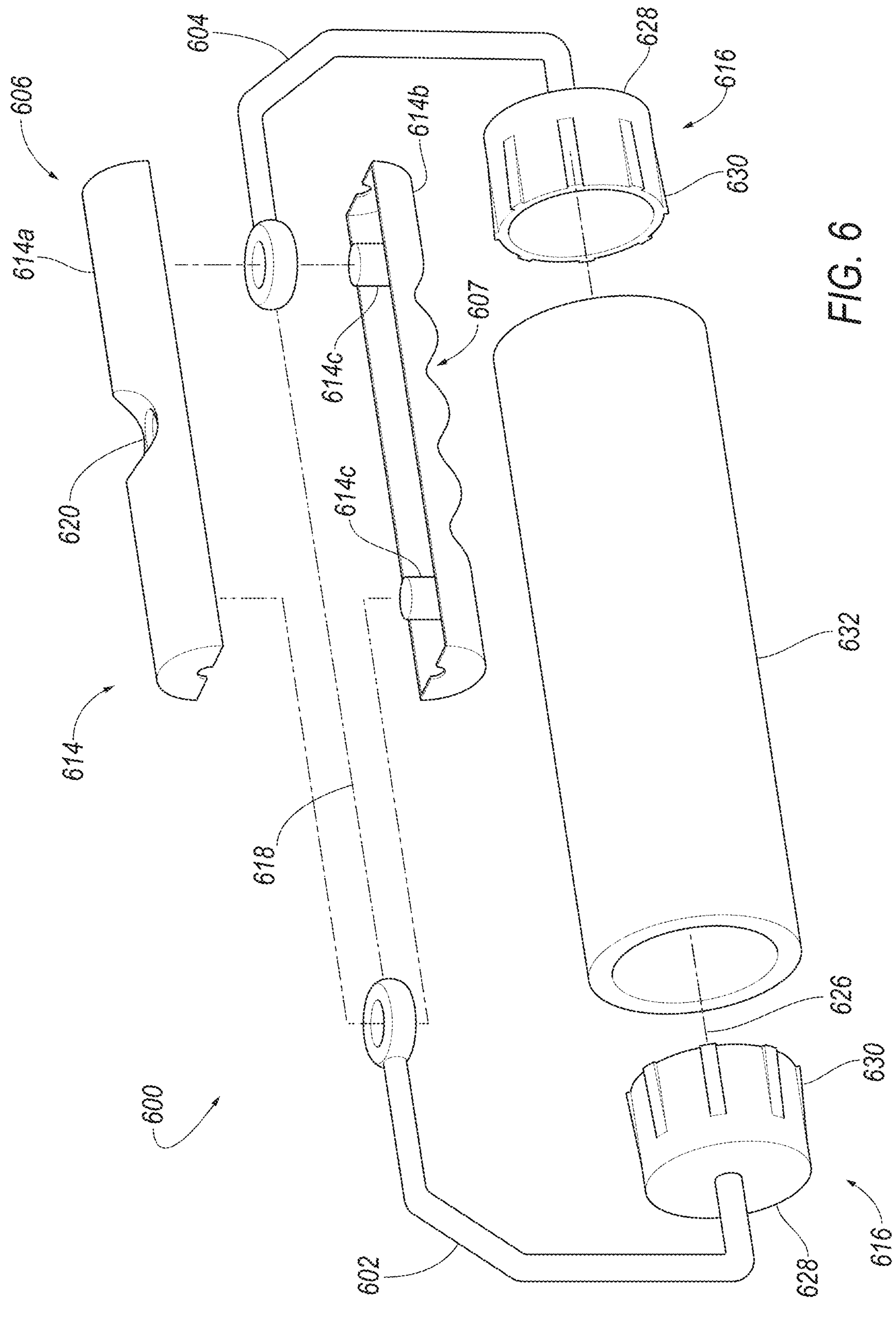
FIG. 6 is an exploded perspective view of a paint roller assembly including an ergonomic handle that is coupled together using a slide-n-lock coupling mechanism according to another aspect of the invention.

Referring now to FIG. 6, a paint roller assembly 600 is shown according to another aspect of the invention. In this aspect, the paint roller assembly 600 includes an ergonomic handle 614 that uses a slide-n-lock coupling mechanism 606 and two frame members or support arms 602, 604 made out of a suitable material, such as metal, and the like. The ergonomic handle 614 includes a fingerhold 607. Similar to the fingerholds 307, 407, 507, the fingerhold 607 is designed to allow the user a more comfortable or more secure hold on the ergonomic handle 614. The ergonomic handle 614 is split in the middle, forming two halves, an upper part 614*a* and lower part 614*b*. At the end of each arm 602, 604 is a cylindrical core 616, which is inserted into the roller cover 632. The cylindrical core 616 comprises a spring cage 630 and two plastic end caps 628. The opposite end of each metal frame member or support arm 602, 604 is bent to form an eye loop or circle. Once both cylindrical cores 616 are inserted into the roller cover 632, the eye loops on each arm 602, 604 are locked in grooves 614*c* located in the lower half of the handle. The upper and lower handles are then placed together, in a slightly offset position. They are then slid together, so they line up, forming the handle of the paint roller assembly. Once the paint roller assembly 600 is assembled, a central, longitudinal axis 618 of the handle 614 is substantially parallel to a central, longitudinal axis 626 of the cylindrical-shaped core 616. This parallel configuration allows the user to apply sufficient pressure to the paint roller assembly 600 to more evenly distribute paint during use as compared to conventional paint roller assemblies.

Located in the middle of the handle, on the top, is a threaded hole 620. This hole 620 can be used to support a conventional handle 634 or an extension pole. When not in use, a plug 628 is used to seal the hole 620 to prevent dirt, paint, etc. from entering the opening 620. The materials used to construct this paint roller assembly 600 can include, but are not limited to, plastic, wood, metal, etc. In addition, the size of all parts, including the main frame, handle, cylindrical core, etc. include, but are not limited to, the proportions shown in the illustrations.

Figure 7:
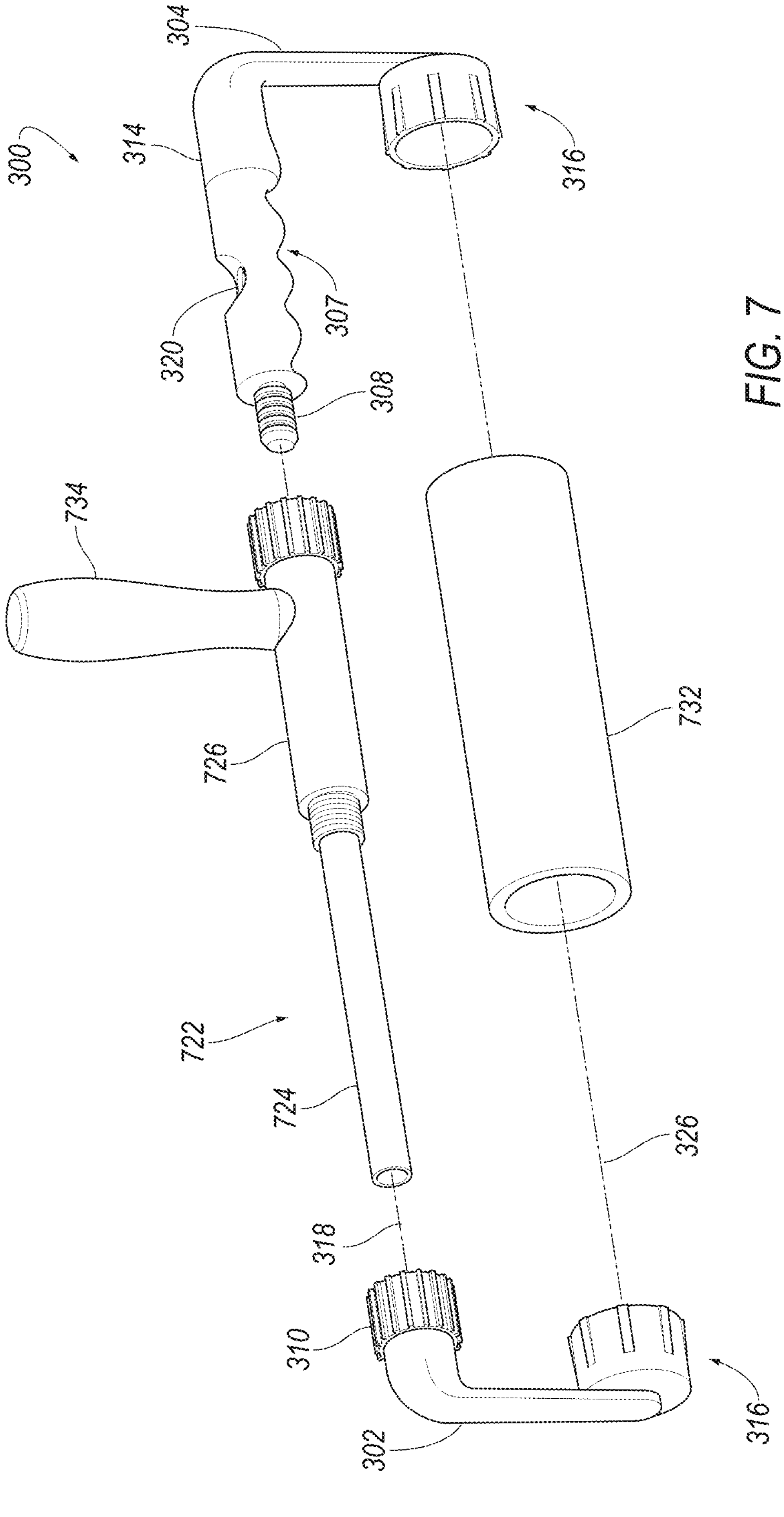
FIG. 7 is an exploded view of a paint roller assembly of FIG. 3A that includes an extension kit according to another aspect of the invention.

Referring now to FIG. 7, a paint roller assembly extension kit 722 is shown according to an aspect of the invention. The extension kit 722 can be used with any of the earlier embodiments of the paint roller assemblies described above. In the illustrated embodiment, for example, the paint roller assembly 300 with the screw-on coupling mechanism 306 is shown. The extension kit 722 can be constructed in a manner that allows the paint roller assembly to be expanded. The extension kit 722 can be purchased separately to expand the size (i.e., the width) of the roller cover or paint applicator 732. In one aspect, the extension kit 722 can easily double the size (i.e., width) of a traditional 9-inch roller cover or paint applicator to at least 18 inches or more. Unfortunately, due to the fact that a rod 724 made of suitable material, such as plastic, and the like, is inserted in the frame members 302, 304 for support, the extension kit 722 can only be used with a conventional handle 734. This conventional handle 734 is permanently attached to an extension piece 726, in what will be the center of the new handle, once it has been connected to the paint roller assembly 300. Depending on the actual handle embodiment, the extension will use the same method for attaching to the paint roller assembly 300. In addition, the conventional handle 734 will be threaded on the end to allow an extension pole as in all the earlier embodiments, thereby providing greater reach for those hard-to-reach spots, for example, a ceiling, a floor, and the like.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A paint roller assembly, comprising:
- a pair of frame members;
- a coupling mechanism for coupling the pair of frame members to each other;
- an ergonomic handle attached to a first end of one of the frame members, the ergonomic handle having a fingerhold and a central, longitudinal axis; and
- a cylindrical-shaped core attached to a second end of each of the frame members, the cylindrical-shaped core configured to rotate about a central, longitudinal axis,
- wherein the central, longitudinal axis of the ergonomic handle is substantially parallel to the central, longitudinal axis of the cylindrical-shaped core when the paint roller assembly is assembled, thereby enabling a user to grasp the ergonomic handle and apply pressure to the paint roller assembly to evenly distribute paint during use.

2. The paint roller assembly of claim 1, further comprising a roller cover removably attached to each cylindrical-shaped core for collecting and dispersing paint.

3. The paint roller assembly of claim 1, wherein the coupling mechanism comprises a screw-on coupling mechanism in which the ergonomic handle includes a male threaded end cap on one frame member that is received within a female threaded coupler on the other frame member.

4. The paint roller assembly of claim 1, wherein the coupling mechanism comprises a twist-n-lock coupling mechanism in which the ergonomic handle includes a male end cap on one frame member that is received within a female coupler on the other frame member.

5. The paint roller assembly of claim 1, wherein the coupling mechanism comprises a pinch-n-release coupling mechanism in which the ergonomic handle includes a female end cap on one frame member that is received within a male end cap on the other frame member.

6. The paint roller assembly of claim 1, wherein the coupling mechanism comprises a slide-n-lock coupling mechanism in which the ergonomic handle includes two halves that is received within eye loops on each frame member.

7. The paint roller assembly of claim 1, wherein at least one frame member includes a hinge for allowing the at least one frame member to open and enable removal or replacement of a roller cover.

8. The paint roller assembly of claim 1, wherein the ergonomic handle includes a threaded hole or receiving a conventional handle.

9. The paint roller assembly of claim 1, wherein the cylindrical-shaped core comprises a spring cage and an end cap.

10. A paint roller assembly, comprising:
- a first frame member and a second frame member coupled to each other by a coupling mechanism, the second frame member including an ergonomic handle having a fingerhold and a central, longitudinal axis; and
- a cylindrical-shaped core attached to a second end of each of the first frame member and the second frame member, the cylindrical core configured to rotate about a central, longitudinal axis,
- wherein the central, longitudinal axis of the ergonomic handle is substantially parallel to the central, longitudinal axis of the cylindrical-shaped core when the paint roller assembly is assembled, thereby enabling a user to grasp the ergonomic handle and apply pressure to the paint roller assembly to evenly distribute paint during use.

11. The paint roller assembly of claim 10, wherein the coupling mechanism comprises a screw-on coupling mechanism in which the ergonomic handle includes a male threaded end cap that is received within a female threaded coupler on the other frame member.

12. The paint roller assembly of claim 10, wherein the coupling mechanism comprises a twist-n-lock coupling mechanism in which the ergonomic handle includes a male end cap that is received within a female coupler on the other frame member.

13. The paint roller assembly of claim 10, wherein the coupling mechanism comprises a pinch-n-release mechanism in which the ergonomic handle includes a female end cap that is received within a male end cap on the other frame member.

14. The paint roller assembly of claim 10, further comprising an extension kit for allowing the paint roller assembly to be expanded in width.

15. The paint roller assembly of claim 10, further comprising a roller cover removably attached to each cylindrical-shaped core for collecting and dispersing paint.

* * * * *